Nov. 8, 1932.  E. D. COWLIN  1,886,791

MULTIPLE COIL SPRING WASHER

Filed June 24, 1931

INVENTOR:
EUGENE D. COWLIN
BY Saypell and Wesseler
ATTORNEYS

Patented Nov. 8, 1932

1,886,791

UNITED STATES PATENT OFFICE

EUGENE D. COWLIN, OF MASSILLON, OHIO, ASSIGNOR TO THE RELIANCE MANUFACTURING COMPANY, OF MASSILLON, OHIO, A CORPORATION OF OHIO

MULTIPLE COIL SPRING WASHER

Application filed June 24, 1931. Serial No. 546,549.

My invention particularly relates to heavy duty spring washers formed of a plurality of coils and having certain portions especially deformed or crimped to provide more resistance to the compressive force which tends to flatten the washer segment when the usual nut against which the outer portion of the washer contacts is tightened. The special deformation in the washer segment, caused by the crimping, is effected either in multiple coil washers of normal helical formation throughout or those whose normal helical formation is broken up by a plurality of distorted portions bent out of the normal helical line. Certain forms of washers, viz., those not having out-turned or positive ends, but which are provided with the special crimped portions, also present a four-point support whereby the washer does not rock between the nut and the work but lies flat. These four points of contact come into play with the nut and the underlying working surface at substantially the same time, two of these points of contact being at the top of the washer and two at the bottom. When it is desired to obviate the biting of the edges of the washer into the washer section, when the latter is compressed, I provide the washer with positive or out-turned ends, which washer ends, when the washer is compressed, are aligned with the special deformed portion formed by the crimps. These washers with positive ends have a two-point support upon or contact with the work and the nut. Various other detailed improvements are present in the improved construction which will be hereinafter fully explained.

The annexed drawing and the following description set forth in detail certain means embodying my invention, such disclosed means constituting, however, but a few of the various forms in which the principle of the invention may be embodied.

Figure 13:
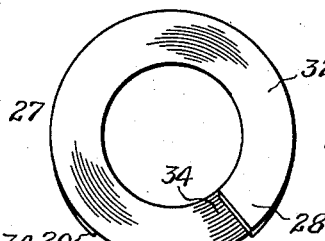

Figure 13 is a plan view of a multiple coil washer segment of general helical formation whose helical surface is broken up by spaced distorted areas and which is further formed with my improved crimps in certain portions, the ends of the washer being in-turned; and Figures 14, 15, 16, and 17 are, respectively, a front elevation, a left side elevation, a right side elevation, and a rear elevation of the washer shown in Figure 13.

Figure 2:
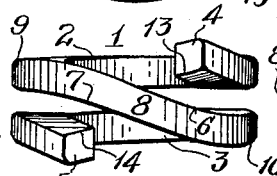
Figure 4:
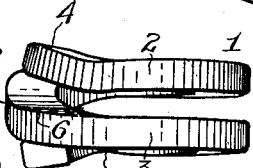
Figure 5:
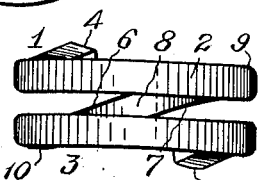
Figure 8:
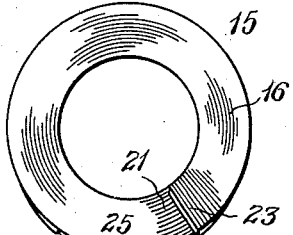
Figure 8 is a plan view of a multiple coil washer segment having a helical formation broken up by spaced distorted areas, and further formed with my improved crimps in certain portions thereof, the ends of the washer being positive or out-turned.
Figure 18:
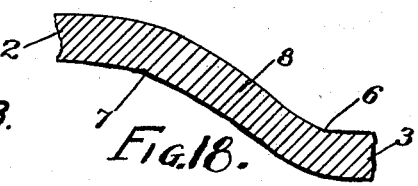
Figure 15:
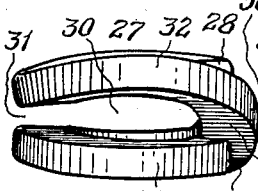
Figure 14:
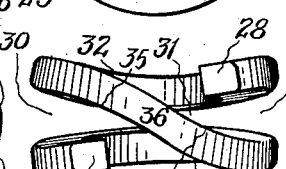
Figure 16:
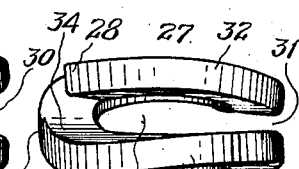
Figure 17:
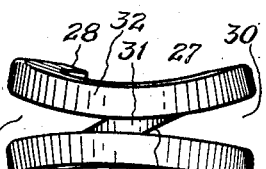

Figure 18 is an enlarged fragmentary cross-section taken in a vertical plane passing through the crimps and washer portions adjacent thereto of the washer shown in Figure 2 and showing in somewhat exaggerated form the crimps in each of the types of washers shown in Figures 1 to 17.

Referring particularly to the annexed drawing in which the same parts are indicated by the same respective numbers in the several views, and particularly referring to Figures 1, 2, 3, 4 and 5, a helical washer segment 1 comprises a plurality of coiled convolutions, two convolutions 2 and 3, as shown, this segment 1 having out-turned ends 4 and 5 which provide what is known as a positiveend structure, the segment being further formed with crimps 6 and 7 with well defined lines of flexion and respectively adjacently below and above the terminal faces of the ends 4 and 5, the crimp 6 being upon the upper face of the coil 3 and the crimp 7 being upon the lower face of the coil 2, so that a deformed portion 8 is formed having a pitch considerably greater than that of the normal helical pitch of the whole segment. These crimps 6 and 7 are shown in somewhat exaggerated form in Figure 18, in which figure a clearly defined line of flexion in the plane of each crimp is represented by the angle between each of the two convolutions 2 and 3 and the common body portion, or connecting portion, 8 of accentuated pitch. The resistance of a washer with such a crimped portion is accentuated by the fact that the washer portions 9 and 10 adjacent the crimps 7 and 6, respectively, contact the nut and the work, respectively, quite early in the operation of tightening the nut; also the steeper incline of the area 8, consequent to the formation of the crimps 6 and 7, increases the resistance of the washer to the compressive force exerted by the nut. By reason of the positive ends 4 and 5, the inner terminal edges 13 and 14 do not bite into the coils 3 and 2, respectively, when the washer is compressed, but the ends 4 and 5 are aligned with the crimped portion 8.

Figure 1:
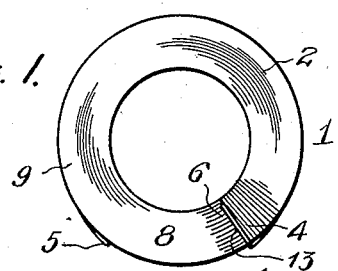
Figure 1 is a plan view of a washer of normal helical formation throughout, except for positive or out-turned ends and except for the improved crimped deformation produced in a certain portion thereof.
Figure 6:
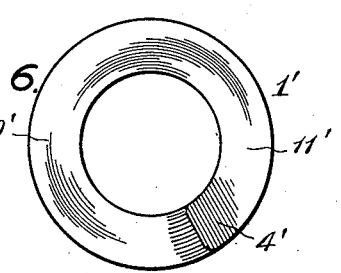
Figures 6 and 7 are, respectively, a plan view and a front elevation of a washer of the type shown in Figures 1 to 5, except that the ends are turned down at the planes where otherwise they would interfere with the washer lying flat between the nut and the work. This construction insures a four-point support for the washer when provided with my improved crimp.
Figure 3:
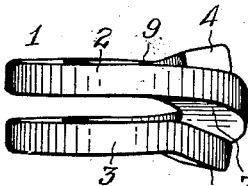
Figures 2, 3, 4 and 5 are, respectively, a front elevation, a left side elevation, a right side elevation, and a rear view of the washer shown in Figure 1.
Figure 7:
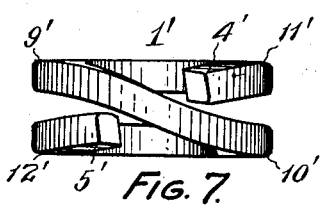
Figure 10:
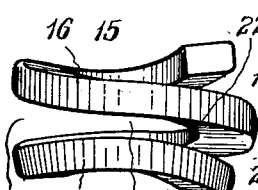
Figures 9, 10, 11 and 12 are, respectively, a front elevation, a left side elevation, a right side elevation, and a rear elevation of the washer shown in Figure 8.
Figure 9:
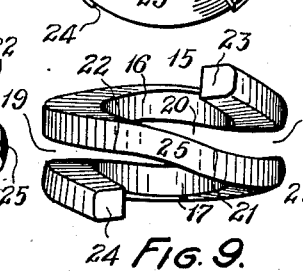
Figure 11:
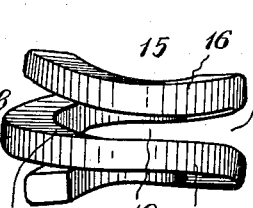
Figure 12:
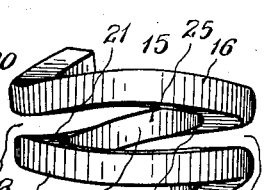

In the form of device shown in Figures 6 and 7, the ends 4' and 5', of the helical washer segment 1', are turned inwardly commencing substantially in the planes where interference would otherwise occur to a balanced or flat condition of the washer. In other words, the points 9', 11', 10' and 12' then form a four-point support between the overlying nut and the underlying work, and the segment is consequently balanced and stays in a flat position. Otherwise, the form of device shown in these Figures 6 and 7 corresponds with that shown in Figures 1 to 5, inclusive.

In the form of device shown in Figures 8 to 12, inclusive, the helical segment 15 is comprised of two coils 16 and 17 of a general helical formation but having their helical surfaces broken up by spaced distorted areas which are each equal, in the illustrative form of device shown, to about one-half of a complete coil, the distortion being caused by producing vertically-aligned high spots and low spots, i. e., a low spot of an upper coil is opposite a high spot of a lower coil, and a high spot of an upper coil is opposite a low spot of a lower coil, so as to form side areas 18 and 19 in which the two coils are closely adjacent and a rear area 20 in which the two coils are quite distantly spaced. This washer 15 is also formed with crimps 21 and 22 upon the upper surface of the coil 17 and the lower surface of the coil 16, respectively, adjacently below and above the respective washer ends 23 and 24, which crimps correspond to crimps 6 and 7 of washer 1 in having well defined lines of flexion and create the deformed portion 25 whose pitch is greatly increased over that of the normal pitch of the segment. This distorted and deformed segment has an extremely high reaction to compressive stresses.

In the form of device shown in Figures 13 to 17, inclusive, which is a helical segment 27 having distorted portions, the ends 28 and 29 are turned in, and the restricted area 31 between the two coils 32 and 33 lies diametrically opposite the opening between the ends. Spaced 90° from this restricted area 31 are diametrically opposed wide areas 30 between the coils 32 and 33. In other words, this helical segment is distorted just opposite to the distorted form shown in Figure 9. The washer form shown in Figures 13 to 17 also contains the crimps 34 and 35 corresponding to crimps 6 and 7 of washer 1 in having well defined lines of flexion and forming the deformed portion 36 which is substantially steeper than the normal helical plane, thereby providing the afore-mentioned greater resistance to the compressive stresses to which the washer is subjected in use. The in-turned ends also provide the four-point support and insure a balanced condition of the segment which has been hereinbefore described.

By a point support is meant a place of contact on a working face of the washer when a nut initially engages the washer and the washer exerts pressure on the base on which it is placed, which place of contact is sufficiently substantial to resist tilting of the washer as the nut tightens thereon. Thus the washers shown in Figures 1 to 5 and Figures 8 to 12 are said to have a two-point support, although they have four places of contact as do the washers shown in Figures 6 and 7 and Figures 13 to 17; two of their places of contact, however, are edges of the washer ends, which edges cause tilting of the washer when it is engaged by the nut, so that there are only two places of contact which tend to maintain the washer in its position.

What I claim is:

1. A spring washer comprising two convolutions of generally helical formation, each of said convolutions terminating in a washer end and being distorted from a true helical formation by a crimp the plane of which has a clearly defined line of flexion and which is substantially alined with the washer end on the other convolution, said two convolutions having a common body portion of accentuated pitch between the two crimps, and each of said convolutions being further distorted from a true helical formation by bending its washer end.

2. The washer defined in claim 1, in which each convolution is further distorted from a true helical formation by a bent portion between its washer end and said common body portion.

3. A spring washer comprising two convolutions of generally helical formation, each of said convolutions terminating in a washer end and being distorted from a true helical formation by a crimp substantially alined with the washer end on the other convolution, said two convolutions having a common body portion of accentuated pitch between the two crimps, the washer ends being bent outwardly, and each of said convolutions being further distorted from a true helical formation by a bent intermediate portion substantially diametrically opposite to said common body portion.

4. A spring washer comprising two convolutions of generally helical formation, each of said convolutions terminating in a washer end and being distorted from a true helical formation by a crimp the plane of which has a clearly defined line of flexion and which is substantially alined with the washer end on the other convolution, each of said two convolutions having a connecting portion of accentuated pitch extending from its crimp toward the other convolution, and each of said two convolutions being further distorted from generally helical formation by bending its washer end.

Signed by me this 5th day of June, 1931.

EUGENE D. COWLIN.